Sept. 30, 1958 H. R. LUTES 2,853,792
MEANS AND METHOD FOR MOUNTING STEREOSCOPIC TRANSPARENCIES
Filed July 28, 1953 3 Sheets-Sheet 3
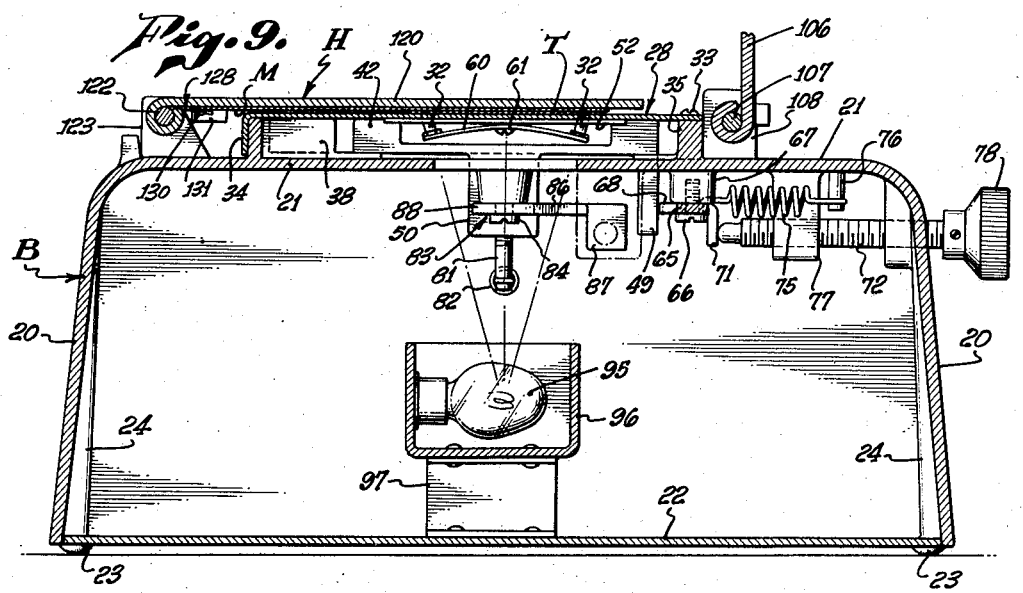
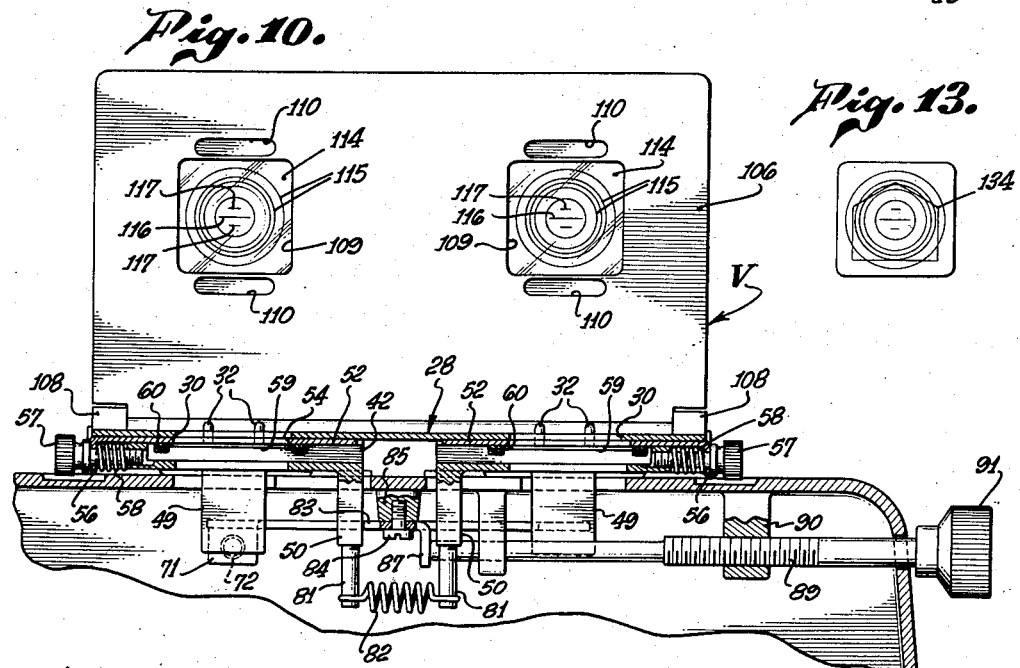
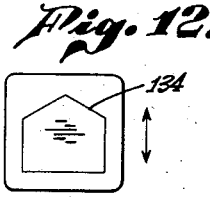
INVENTOR.
HAROLD R. LUTES,
BY
Paul A. Weilein
ATTORNEY.

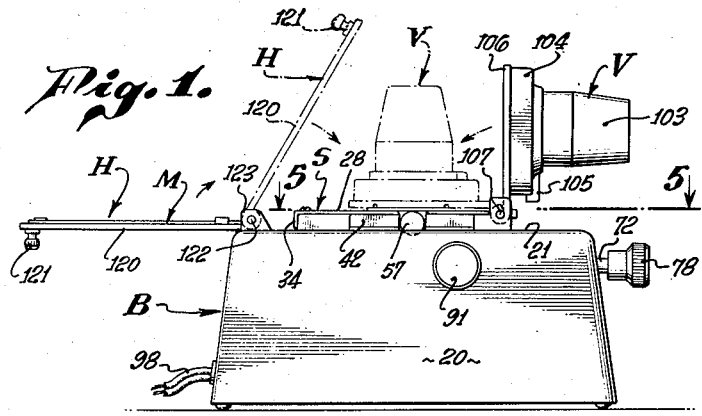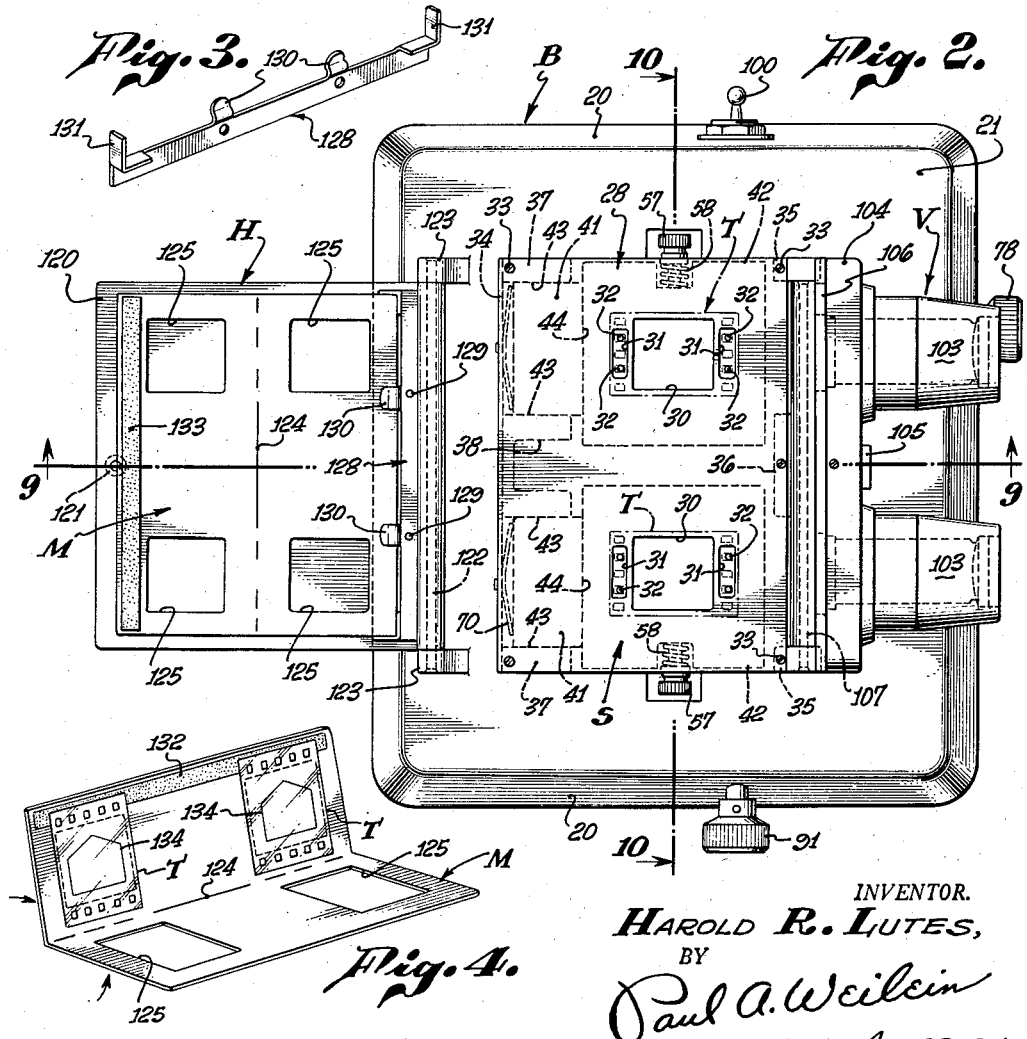

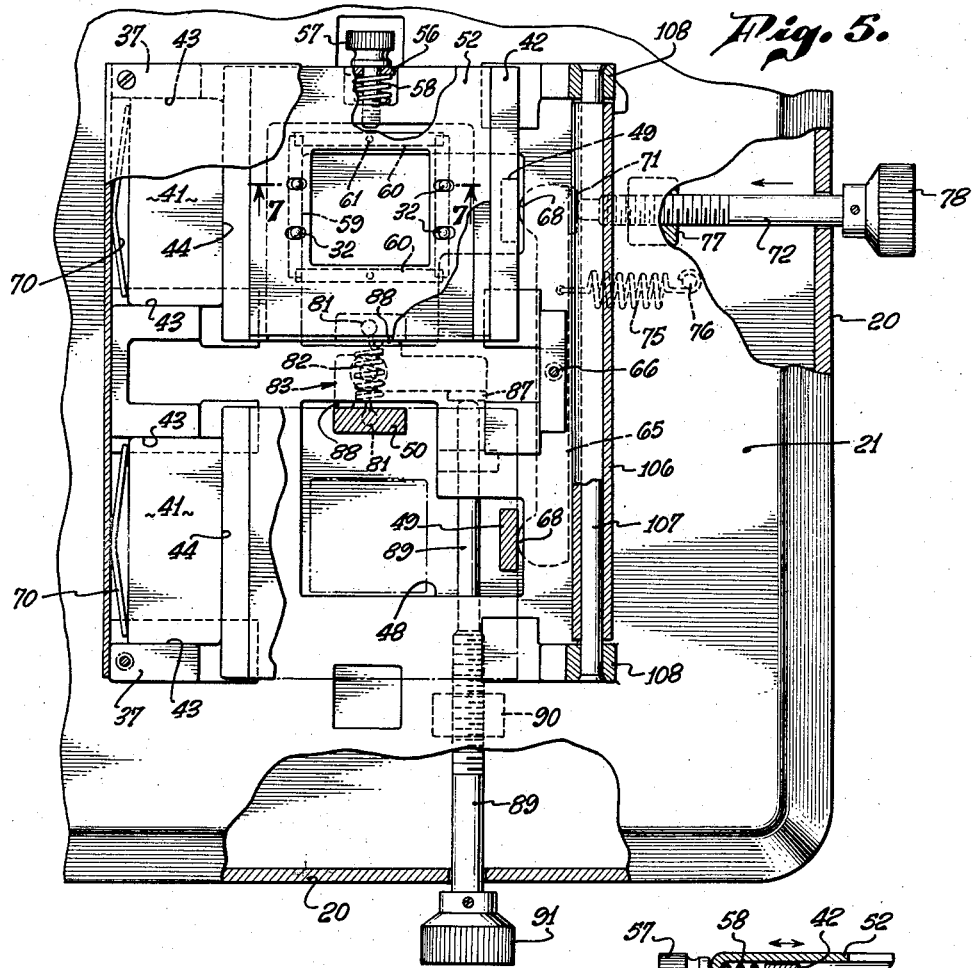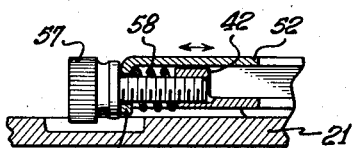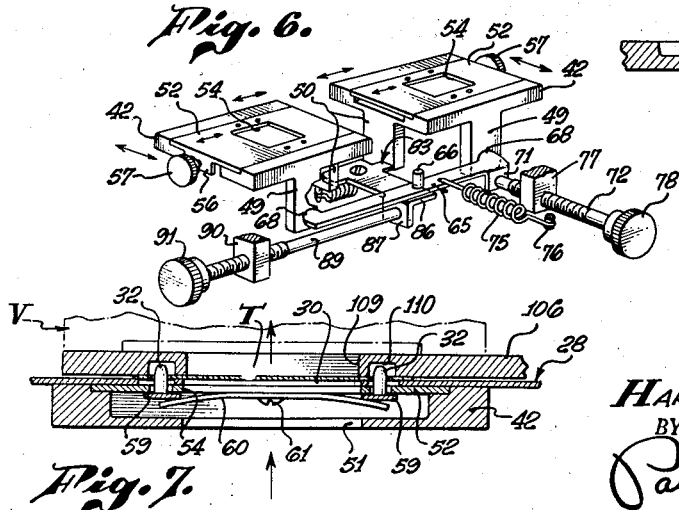

United States Patent Office 2,853,792
Patented Sept. 30, 1958

2,853,792

MEANS AND METHOD FOR MOUNTING STEREO-SCOPIC TRANSPARENCIES

Harold R. Lutes, San Gabriel, Calif.

Application July 28, 1953, Serial No. 370,766

27 Claims. (Cl. 33—184.5)

This invention relates to devices and methods for mounting photographic transparencies on supporting masks and is directed particularly to a device and method for mounting stereoscopic pairs of transparencies on supporting masks or slides for use in stereoscopic projectors and for use in hand viewers.

The problem in mounting stereoscopic transparencies is to avoid various causes for visual discomfort in the subsequent viewing of the pictures, which causes are found in improper positioning of the transparencies. A first cause for visual discomfort is found in one or both of the transparencies being turned out of orientation with respect to the two windows or apertures in the mask. A second cause for visual discomfort arises from the fact that in most stereoscopic cameras the pair of lenses are at fixed spacing from each other with their optical axes parallel or nearly parallel, so that pictures taken at near and close ranges have their corresponding image points at different relations to the picture margins than is the case in pictures taken at longer ranges. This second cause of visual discomfort may be largely met by compensating adjustment in the spacing between the two transparencies. The amount of compensation to be sought, however, is a matter of individual preference because the spacing determines the so-called "window effect", i. e., the apparent distance of the plane of the subject from the apparent plane of the window formed by the two mask apertures.

A third cause of visual discomfort is vertical misalignment of the image points in the two transparencies arising from camera tilt at the time the picture is taken. To avoid this third cause of discomfort, the two transparencies must be adjusted in vertical alignment relative to each other to compensate for the tilt of the camera.

Stereoscopic transparencies are mounted on a support means or mask having the required pair of rectangular window apertures and the prevailing mounting method is to use a jig for holding the mask and for positioning the two transparencies over the window apertures in accurate orientation therewith. Commonly, two kinds of masks are available, one having normally dimensioned and spaced apertures and the other having apertures differently dimensioned and differently spaced for close-up shots. The usual jig, however, places the two transparencies at the same spacing on both types of masks.

This prevailing method deals satisfactorily only with the first of the three mentioned causes of visual discomfort, i. e., discomfort arising from improper orientation of the two transparencies. With reference to the second cause of visual discomfort, merely changing the spacing and dimensioning of the two window apertures by substituting a special close-up mask for the normal mask, does not vary the spacing between corresponding aperture points on the two transparencies themselves.

The broad object of the present invention is to provide a device and method for mounting stereoscopic transparencies of high accuracy with respect to the orienting and spacing of the two transparencies and also of sufficient flexibility not only to permit complete elimination of the aforementioned causes of visual discomfort, but also to permit wide freedom of choice with respect to the window effect to be achieved.

In general, the broad object is attained by using what may be termed an adjustment assembly that includes two pairs of guide members to guide the adjustment movements of the transparencies in the vertical and horizontal directions of the stereoscopic image. Fixed guide surfaces extending in one of the two directions of the image are in constant guiding contact with one of the two pairs of members, and this one pair of members has guide surfaces perpendicular to the fixed guide surfaces. The second pair of members is in constant guiding contact with these perpendicular guiding surfaces and at the same time are releasably connected with the two stereoscopic transparencies. Thus movement of the two members of the first pair along the fixed guide surfaces adjusts the two transparencies in one of the two directions of the stereoscopic image, and movement of the members of the second pair along the perpendicular guide surfaces of the first pair adjusts the transparencies in the second direction of the stereoscopic image. The second pair of members is adapted to hold the transparencies in accurate orientation so that correct orientation is maintained throughout all adjustment movement along the fixed and movable guide surfaces. Preferably, the two transparencies are additionally adjustable relative to the second pair of members with which they move, the character of the adjustment again being such as to maintain orientation of the two transparencies.

One of the important objects of the invention is to provide means for viewing the two transparencies optically for guidance in the procedure of adjusting the two transparencies as well as to permit final inspection of the adjusted transparencies before the final step of permanently bonding the transparencies to the supporting mask. In this respect, the invention is characterized by the inclusion of a stereoscopic viewer that is movable into a position for viewing the two transparencies while the two transparencies are under the control of the adjustable assembly.

A special object of the invention is to provide an optical means and method for guidance in aligning the two transparencies vertically relative to each other and to aid in the horizontal spacing of the two transparencies for various window effects. This object is attained by the provision of two fixed reticles in the optical system of the stereoscopic viewer, which reticles are adjusted to create an image in the plane of the apparent window created by the two window apertures of the mask. As will be explained, the two reticles provide accurate means for ascertaining vertical discrepancy in the positioning of the two transparencies and, in addition, indicate to the observer the location of the window plane as a reference for guidance in adjusting the window effect.

A further object of the invention is to provide a means and method for accurately bonding the accurately positioned transparencies to a supporting mask. In this regard, the invention is characterized by the combination with the adjustable assembly of a mask holder movable into an accurately predetermined position relative to the adjustment assembly.

The various objects, features and advantages of the invention may be understood from the following detailed description of a preferred embodiment of the invention, considered with the accompanying drawings.

Referring to the drawings:

Fig. 1 is a side elevation of the presently preferred embodiment of the invention;

Fig. 2 is a plan view on a larger scale;

Fig. 3 is a perspective view of a clip that may be used to retain a mounting mask on the mask holder;

Fig. 4 is a perspective view showing one form of mounting mask with two transparencies bonded thereto;

Fig. 5 is a section on an enlarged scale taken along the line 5—5 of Fig. 1, with parts broken away to reveal concealed structure;

Fig. 6 is a perspective view of a pair of movable members of the adjustment assembly;

Fig. 7 is an enlarged section taken as indicated by the line 7—7 of Fig. 5;

Fig. 8 is an enlarged section showing one of a pair of adjustments incorporated in the adjustment assembly;

Fig. 9 is a section taken as indicated by the line 9—9 of Fig. 2;

Fig. 10 is a fragmentary section taken as indicated by the line 10—10 of Fig. 2;

Fig. 11 is a face view of a stereoscopic image with a pair of laterally displaced reticle images superimposed thereon;

Fig. 12 is a similar view of a stereoscopic image with a pair of vertically displaced reticle images superimposed thereon; and Fig. 13 is a similar view of a stereoscopic image with a single reticle image centered thereon.

The principal parts of the device as seen in Fig. 1 include a base structure B providing an assembly surface S; a stereoscopic viewer V that is movable to the dotted position on the assembly surface; and a holder H that is also movable into position adjacent the assembly surface S. These various parts may be constructed in various ways in various practices of the invention.

The base structure B in this embodiment of the invention comprises an open bottom shell which may be a casting of suitable material having four side walls 20 and a top wall 21. As best shown in Fig. 9, the bottom of the shell is closed by a bottom plate 22 having four rubber support bodies 23 at its four corners. In the construction shown, the shell is formed with corner ribs 24 to which the bottom plate 22 is secured by suitable screws (not shown) which screws are embedded in the rubber support bodies 23 to anchor the support bodies to the base structure.

Suitably mounted on the top wall 21 of the base structure is an assembly plate 28 providing the assembly surface S. The plate 28 is formed with two rectangular window apertures 30 over which a pair of stereoscopic transparencies T may be positioned as shown by dotted lines in Fig. 2 to be viewed by transmitted light admitted through the two window apertures. On opposite sides of each of the window apertures 30, the plate 28 is provided with a pair of elongated auxiliary apertures 31, each of which surrounds a pair of pins 32. Each pair of the pins 32 is adapted to extend through corresponding sprocket holes in the ends of the two transparencies T to hold the transparencies in a releasable manner. The auxiliary apertures 31 are large enough to permit each pair of the pins 32 ample room for movement to vary the positions of the transparencies on the assembly surface S. It is contemplated that at all positions of adjustment the pairs of pins 32 will be aligned parallel to the ends of the window apertures 30 so that the transparencies T will be held oriented relative to the two window apertures at all positions to which the transparencies may be adjusted. The pins 32 are carried by what may be termed an adjustment assembly mounted immediately below the apertured plate 28, as will be described.

The apertured plate 28 is attached by screws 33 to a plurality of supporting lugs extending upward from the top wall 21 of the base structure and one edge of the plate is bent to form a downward flange 34. The supporting lugs include two corner lugs 35 and an intermediate lug 36 along one side of the plate, and two corner lugs 37 and an intermediate U-shaped lug 38 along the opposite side of the plate.

The adjustment assembly for controlling the transparency-retaining pins 28 includes a first pair of members 41 and a second pair of members 42, both of which pairs of members are slidingly mounted between the under surface of the apertured plate 28 and the upper surface of the top wall 21 of the base structure. In the present embodiment of the invention, the first pair of members 41 are in the form of simple rectangular blocks guided by the two corner lugs 37 and the U-shaped lug 38. For this purpose, the two corner lugs and the intermediate U-shaped lug are formed with parallel guide surfaces 43 for guiding contact with the opposite sides of the pair of slide members 41. These fixed guide surfaces 43 are positioned to correspond to vertical direction in the stereoscopic image of the pair of transparencies T. Each of the two slide members 41 has a guide surface 44 perpendicular to the fixed guide surfaces 43 and the second pair of members 42 is in sliding contact with these perpendicular guide surfaces. The guide surfaces 44 correspond to the horizontal direction in the stereoscopic image.

Each of the members of the second pair of members 42 is positioned over an angular opening 48 (Fig. 5) in the top wall 21 and each is preferably of rectangular configuration with two downwardly extending tongues 49 and 50. The tongue 49 is used to move the member in the vertical direction of the image and the tongue 50 serves for moving the member in the horizontal direction. These four tongues 49 and 50 extend downward through the two angular openings 48 to receive control forces applied inside the base structure. Each of the members 42 has a central aperture 51 (Fig. 7) which corresponds to and is slightly larger than the corresponding window aperture 30 in the assembly plate 28.

While the transparency-engaging pins 32 may be mounted directly on the second pair of guide members 42, preferably each set of four pins 32 is mounted on a slide plate 52 and the slide plate 52 is, in turn, mounted on the corresponding member 42 for movement relative thereto in the horizontal direction of the image. As best shown in Figs. 6 and 7, each of the two members 42 is recessed to provide a guide channel for the corresponding slide plate 52 and the slide plate has a large aperture 54 to register with the corresponding window aperture 30 of the assembly plate 28.

One end of each slide plate 52 is formed with a downward flange 56 (Fig. 6) to receive a thumb screw 57 for adjustment of the slide plate relative to the corresponding member 42. As best shown in Fig. 8, the head of the thumb screw 57 abuts the flange 56 and the thumb screw extends through the flange into the side of the member 42. A suitable helical spring 58 surrounds the thumb screw 57 between the member 42 and the flange 56 of the slide plate 52 and thereby causes the slide plate to follow adjustments of the screw.

Each pair of the transparency-retaining pins 32 that extends upward through one of the auxiliarmy apertures 31 in the assembly plate 28 is carried by a leaf spring 59, and the two ends of the two leaf springs 59 are yieldingly supported, in turn, by the two ends of a second pair of leaf springs 60. Each of the second pair of leaf springs 60 is mounted on the under side of the corresponding member 42 by a screw 61 (Fig. 7). Thus, each pair of pin-bearing leaf springs 59 is floatingly mounted by a second pair of leaf springs 60. The cooperating leaf springs normally hold the various pins 32 in positions extending upward through the auxiliary apertures 31 above the plane of the assembly surface S, but the pins may be pushed below that surface in opposition to the leaf springs.

It is contemplated that the first pair of members 41 and the second pair of members 42 of the adjustment assembly will be controlled with respect to the vertical direction in the image in response to pressure exerted against the two downwardly extending tongues 49 of the second pair of members 42. For the purpose of exercising such control, the two downwardly extending tongues 49 are in contact, respectively, with the two opposite arms of a control lever 65. The control lever 65, which is pivotally mounted by a screw 66 (Fig. 9) on a downwardly extending fixed boss 67, has two rounded end portions 68 for contact with the two downwardly extending tongues 49 respectively. Contact between the tongues 49 and the lever is maintained by pressure exerted by a pair of angular leaf springs 70 (Fig. 5) acting on the first pair of members 41. The leaf springs 70 are under stress between the two members 41 and the downward flange 34 of the assembly plate 28.

As best shown in Fig. 6, one arm of the control lever 65 is formed with a downward flange 71 which abuts against a suitable adjustment screw 72. Constant abutment of the control lever against the adjustment screw is maintained by a suitable coiled tension spring 75, one end of which is connected to the control lever 65 and the other end of which is anchored by a screw 76 (Fig. 6) on the under side of the top wall 21 of the base structure. As best shown in Figs. 5 and 6, the adjustment screw 72 is threaded through a fixed downwardly extending lug 77 and extends to the outside of the base structure shell for manipulation by means of an external adjustment knob 78. It is apparent that rotation of the adjustment knob 78 will rock the control lever 65 to move the two members 41 and the two members 42, with the left-hand members moving in one vertical direction of the image and the right-hand members moving in the opposite vertical direction of the image. Thus, rotation of the knob 78 will cause one of the two transparencies T to move in one vertical direction and simultaneously will cause the other transparency to move in the opposite vertical direction.

In the present embodiment of the invention, the two downwardly extending tongues 50 of the two members 42 are provided with downwardly extending posts 81 (Fig. 10), and these two posts are interconnected by a tension spring 82 that exerts a constant force tending to draw the two members 42 together. As best shown in Figs. 6 and 10, a suitable cam member 83 is interposed between the two tongues 50 to hold the tongues apart in a variable manner in opposition to the tension spring 82, so that rotation of the cam member will control the horizontal spacing between the two transparencies T. The cam member 83 is pivotally mounted on a central screw 84 on a downwardly extending lug 85 and is provided with an integral control arm 86 having a flange 87. The cam member 83 has two cam arms 88 in sliding contact with the opposing surfaces of the two downwardly extending tongues 50 and these cam arms are staggered with respect to the pivotal axis to cause the cam member to tend to rotate clockwise, as viewed in Fig. 6, in response to the force of the tension spring 82. This clockwise force is opposed by abutment of the control arm flange 87 against the end of an adjustment screw 89. The adjustment screw 89, which is threaded through a downwardly extending lug 90, extends to the exterior of the base structure and is provided with an external knob 91. Thus, rotation of the knob 91 clockwise, as viewed in Fig. 6, causes the two members 42 to be moved apart and counterclockwise rotation permits the two members 42 to be drawn together by the tension spring 82.

Preferably suitable means is incorporated in the base structure B to illuminate the transparencies from below. As shown in Fig. 9, the illumination means may comprise a lamp bulb 95 in a lamp housing 96, which is supported by a bracket 97 on the bottom plate 22. The lamp bulb 95 is in a circuit that includes a light cord 98 (Fig. 1) and is controlled by a suitable switch 100 (Fig. 2) on the side of the base structure.

As best shown in Figs. 1 and 2, the viewer V may be of conventional construction, having two lens barrels 103 and a base 104 carrying the usual focusing knob 105. The viewer is adapted to cooperate with the base structure B for accurate positioning of the viewer over the two window apertures 30 of the assembly plate 28. For this purpose, the viewer may be hingedly mounted on the base structure.

In the construction shown, the viewer has a base plate 106 with one edge of the base plate looped around a hinge pin 107. The two ends of the hinge pin 107 are mounted in corresponding lugs 108 extending upward from the top wall 21 of the base structure. As shown in Fig. 7, the base plate 106 of the viewer has a window aperture 109 to register with each of the window apertures 30 in the assembly plate 28 and is also provided with downwardly facing recesses 110 to register with the auxiliary apertures 31 of the assembly plate and to clear the pairs of pins 32 at all positions of adjustment of the pins. By virtue of this arrangement the viewer may be swung to the viewing position shown in dotted lines in Fig. 1 without moving against the upwardly extending pins 32 and the two transparencies may be adjusted freely while the two transparencies are being observed through the viewer.

As heretofore stated, a feature of the invention is the incorporation of a pair of reticles in the viewer V to indicate the apparent plane of the window that is formed stereoscopically by the two window apertures 30 in the assembly plate 28. For this purpose, a plate of glass 114 (Fig. 10) is mounted on the inner face of the viewer base plate 106 over each of the two base plate windows 109 and each of these glass plates is provided with a suitable reticle pattern. In this embodiment of the invention, the reticle pattern, as may be seen in Fig. 10, comprises a series of concentric rings 115 and a central horizontal mark 116 flanked by two shorter horizontal marks 117.

The holder H may comprise simply a plate 120 that is adapted to hold a mask M and is adapted to cooperate with the base structure B for accurate positioning of the mask against the adjusted transparencies T on the assembly plate 28. In the construction shown in the drawings, the plate 120 is provided with a suitable handle 121 and is hingedly mounted on the base structure B by a hinge pin 122 (Fig. 9). One edge of the holder plate 120 is rolled around the hinge pin and the two ends of the hinge pin are mounted in a pair of upwardly extending lugs 123. Thus, the holder is movable from a retracted position shown in Figs. 1 and 2 to an assembly position shown in Fig. 9.

It is contemplated that the holder H will be adapted to releasably engage a mask M with the mask accurately positioned on the holder with respect to the window apertures 30 of the assembly plate 28 on the base structure. The particular mask M shown in Figs. 2 and 4 comprises a thin sheet of suitable material having a fold line 124. The fold line divides the mask into two halves and each of which halves has a pair of window apertures 125. It is contemplated that the two transparencies T will be bonded to one half of the mask M at the positions shown in Fig. 4 and that the mask will then be folded to form the familiar stereoscopic slide member.

The required means for holding the mask M in accurately predetermined position on the holder H may comprise a spring metal clip 128 (Fig. 3) mounted on the inner surface of the holder plate by suitable screws 129 (Fig. 2). The clip 128 is formed with a pair of tongues 130 which cooperate with the holder plate to yieldingly engage the lower margin of the mask M as shown in Fig. 2. At its two ends, the clip 128 is formed with angular flanges 131 which serve as guides for engagement with the lower edges and sides of the mask for accurately positioning the mask on the holder. It is a simple matter to slip the lower margin of the mask M under the two tongues 130 to seat the lower corners of the mask in the two flanges 131, the flanges serving as positioning stops for the mask. With the mask releasably mounted on the holder H in this manner, rotation of the holder from the retracted position shown in Fig. 2 to the folded position shown in Fig. 9 carries the mask M into accurate assembly position relative to the two transparencies T held by the pins 32. As the holder H swings into its folded position, the mask on the holder contacts the various pins 32 and forces the pins to retract as shown in Fig. 9 to release the transparencies.

Various procedures known to the art may be utilized for bonding the two transparencies to the mask M. In the preferred practice of the invention, the mask M is provided with an adhesive coating to form a bond between the mask and the transparencies when the mask is pressed against the transparencies by the folding action of the holder H. For this purpose, the mask M may be provided with a strip of adhesive coating 132, best shown in Fig. 4, which is normally protected by a corresponding strip of paper 133 as shown in Fig. 2. After the mask has been properly positioned on the holder H as shown in Fig. 2, the strip of paper 133 may be peeled off to expose the adhesive coating 132. When the holder H is then folded against the assembly plate 28 as shown in Fig. 9, the two transparencies T are released by the consequent retraction of the pins 32 and, simultaneously, the pressure-sensitive adhesive coating 132 makes contact with the two transparencies T to cause the two transparencies to be bonded to the mask. Thus, the transparencies will be attached to the mask at positions precisely predetermined by the adjustment mechanism associated with the pins 32.

The operation and utility of the device may be readily understood from the foregoing description. Two transparencies of a stereoscopic pair are first mounted on the assembly surface S of the plate 28 in engagement with the pins 32 and then, with the lamp bulb 95 energized, the viewer V is swung from the retracted position shown in Fig. 2 to the viewing position shown by dotted lines in Fig. 1. Since the pins 32 are cleared by the recesses 110 in the viewer, the viewer does not interfere with whatever movements of the pins are required to adjust the positions of the transparencies on the assembly surface S. Thus, the transparencies may be adjusted by the knobs 78 and 91 while the transparencies are under observation through the viewer. If any preliminary adjustment of the transparencies relative to the window apertures 30 of the assembly plate are necessary, the operator rotates the corresponding thumb screws 57 which are conveniently accessible on the opposite sides of the viewer. These thumb screws 57 cause the transparencies to move in the horizontal direction of the image, but horizontal adjustment of the two transparencies relative to each other is to be performed primarily by bodily movement of the two members 42 relative to each other rather than by movement of the two side plates 52 relative to the members 42.

The first inspection of the two transparencies through the viewer V reveals at once whether or not the two transparencies are in their proper right and left positions. If the left transparency is over the right aperture window 30 and the right transparency is over the left aperture window, there will be an easily recognized psuedoscopic effect to indicate that the two transparencies should be switched.

The two reticles are positioned to produce a single image of the reticle pattern that appears to be in the plane of the two window apertures 30 and the two reticle patterns will form the single image if the eyes of the operator are focused for the window plane. If, however, the operator's eyes are adjusted or focused on image planes beyond the window plane, the two reticles will form two overlapping images. Since the user's eyes adjust themselves to the image points on the two transparencies, the relative positions of the two overlapping reticle images will be affected by any vertical misalignment that may exist between the two transparencies. If corresponding image points are in horizontal alignment, the focusing of the eyes on the image plane beyond the window plane will cause the circular elements of the reticle patterns to be offset horizontally. The horizontal lines 116 and 117 of the reticle image will also be offset horizontally but will appear merely to be horizontally elongated. Such a composite reticle pattern is shown in Fig. 11.

On the other hand, if the two transparencies are misaligned vertically, the focusing of the eyes on the image planes beyond the window plane will cause vertical displacement as well as horizontal displacement of the two reticle patterns. Fig. 12 shows how the combined vertical and horizontal displacement is revealed by the horizontal lines 116 and 117, the concentric rings of the reticle patterns being omitted. To correct such vertical misalignment, the operator rotates the knob 78 in the appropriate direction until he brings the various horizontal lines of Fig. 12 into the alignment shown in Fig. 11, thus reducing a composite image of six horizontal lines to a composite image of three lines. This use of two reticle patterns for precision adjustment of the two transparencies with reference to the vertical direction of the stereoscopic image is an important feature of the invention.

It will be noted that in the movements of the two transparencies both for vertical adjustment and for horizontal adjustment, the transparencies move simultaneously in opposite directions at equal rates. Thus starting with the two transparencies at equal distances from a common center, they remain at equal distances throughout all adjustments.

In Figs. 11 and 12, the stereoscopic image includes the image 134 of a house. If the eyes are adjusted or focused at the window plane, the two reticles will form a single reticle image at that plane and the house 134 will appear, of course, to be at a distance beyond the plane of the image. On the other hand, if, with the two transparencies in accurate vertical adjustment relative to each other, the eyes are focused or adjusted on the apparent image 134 of the house, the reticle images will be displaced horizontally in overlapping relation as shown in Fig. 11. It is apparent, then, that the two reticles in the optical system of the viewer provide means for judging the apparent relative distances of objects with reference to the window plane. Thus, the reticles enable the operator of the device to adjust the two transparencies to place a selected image plane at whatever apparent distance behind the window plane may be desired. The adjustments to vary the apparent distance of image planes from the window plane are accomplished simply by rotating the knob 91 to cause the two transparencies to be moved horizontally either toward each other or away from each other as may be desired.

When the two transparencies are finally adjusted to the satisfaction of the operator, the viewer is swung to its standby or retracted position, a mask M is placed on the holder H, the strip of paper 133 is peeled away from the mask, and the holder is swung to its folded position to press the accurately positioned mask against the two transparencies. The transparencies adhere to the mask automatically. The operator then swings the holder back to its retracted position for removal of the mask with the transparencies adhering thereto. The operator then folds the mask on the fold line 124 in the manner indicated by Fig. 4 to make the usual "sandwich." The exposed adhesive 133 between the two folded portions of the mask bonds the two folded portions of the mask together.

It is apparent that the described procedure accurately corrects for any vertical misalignment of the pictures arising from camera tilt and permits the user to vary the horizontal distance between the two transparencies in accord both with the actual camera distance of the subject and in accord with individual preference with respect to the apparent distance of the image planes from the window plane. Since all of the adjustments of the transparencies are carried out before the transparencies are bonded to the mask, the transparencies are always correctly mounted and any necessity for dismounting the transparencies from a mask for correction of their positions is avoided.

Since the assembly mechanism accurately orients all transparencies and may be adjusted for accurate positioning of the transparencies independently of the viewer V, the viewer may be omitted in some practices of the invention.

My description in specific detail of a preferred practice of the invention will suggest to those skilled in the art various changes, substitutions and other departures from my disclosure that properly lie within the spirit and scope of the appended claims.

I claim:

1. In a device for mounting a pair of stereoscopic transparencies with accurate alignment relative to the vertical and horizontal directions of the image and with selective window effect, the combination of: a base structure having fixed guide surfaces corresponding to one of said directions; a first pair of guide means movably mounted on said base structure for individual movement in guiding contact with said fixed surfaces, said first pair of guide means having guide surfaces perpendicular to said fixed guide surfaces to correspond to the other of said two directions; a second pair of guide means movably mounted on said base structure in constant guiding contact with said perpendicular surfaces of said first pair of guide means for individual movement both with and relative to said first pair of guide means; a pair of means to releasably engage the pair of transparencies, respectively, said pair of engagement means being carried by said second pair of guiding means and being oriented with respect to said two directions; means to move said first pair of guide means along said fixed surfaces to adjust the two transparencies relative to each other with respect to one of said directions; and means to move said second pair of guide means relative to said first pair of guide means along said perpendicular guide surfaces to adjust the two transparencies relative to each other with respect to the other of said two directions.

2. A device as set forth in claim 1 in which the two guide means of each of said pairs move in opposite directions simultaneously to maintain said two transparencies at substantially equal distances from a common center.

3. A device as set forth in claim 1 in which said fixed guide surfaces correspond to the vertical direction of the image and in which the means to move said second pair of guide means relative to said first pair of guide means is adapted to move the two means of said second pair simultaneously in opposite directions.

4. A device as set forth in claim 1 in which said pair of engagement means are adjustably mounted on said second pair of guide means for independent adjustment of the two transparencies.

5. In a device for mounting a pair of stereoscopic transparencies with accurate alignment relative to the vertical and horizontal directions of the image and with selective window effect, the combination of: a base structure having a plurality of parallel guide surfaces to represent said vertical direction of the image; a first pair of movable members in guiding contact with said fixed surfaces for movement along parallel paths, said members having guide surfaces perpendicular to said vertical-representing surfaces to represent said horizontal direction; a second pair of movable members movable with said first members in constant guiding contact, respectively, with said horizontal-representing surfaces; means carried by said second pair of movable members to releasably hold said transparencies in positions oriented with said guide surfaces; means to move the members of said first pair of movable members relative to each other along said fixed vertical-representing surfaces, thereby to adjust said transparencies vertically relative to each other; and means to move the members of said second pair of movable members relative to each other along said horizontal-representing surfaces, thereby to adjust said transparencies horizontally relative to each other.

6. A device as set forth in claim 5 which includes a pivoted control member operatively connected to said two pairs of movable members on opposite sides of the axis of the control member to cause the two transparencies to move simultaneously in opposite directions.

7. A device as set forth in claim 6 in which portions of said operating member on opposite sides of its axis of rotation are in contact with the members, respectively, of said second pair of members; and which includes yielding means acting on said first pair of members to urge said second pair of members into contact with said control member.

8. A device as set forth in claim 5 which includes yielding means to urge the members of said second pair of movable members towards each other and control means to variably spread the two members apart in opposition to said yielding means.

9. In a device for mounting a pair of stereoscopic transparencies with accurate alignment relative to the vertical and horizontal directions of the image and with selective window effect, the combination of: a base structure; two means on said base structure to releasably engage said two transparencies, respectively, with the two transparencies oriented parallel with each other; means on said base structure operatively connected with said two engagement means to adjust said two transparencies relative to each other with respect to both said directions of the image; and a stereoscopic viewer mounted on said base structure for movement between a retracted position exposing said engagement means and a viewing position over said engagement means for visual guidance in the adjustment of the two transparencies.

10. A device as set forth in claim 9 in which said viewer has two reticles to produce an image in the window plane for guidance in adjusting said transparencies for selected window effects.

11. A device as set forth in claim 9 which includes a holder for a mounting mask, said holder being mounted on said base structure for movement between a retracted position and a position over said engagement means to place the mask in accurate position relative to said two transparencies.

12. A device as set forth in claim 11 in which said two engagement means are releasable in response to movement of said holder into said assembly position to permit the transparencies to be transferred from the engagement means to the mounting mask.

13. In a device for mounting a pair of stereoscopic transparencies with accurate alignment relative to the vertical and horizontal directions of the image and with selective window effect, the combination of: a base structure having fixed guide surfaces representing one of said directions in the image, said base structure having an assembly surface with two openings therein for the transmission of light through said two transparencies, respectively; a first pair of movable members in guiding contact with said guide surfaces for movement along parallel paths, said members having guide surfaces perpendicular to said fixed guide surfaces to represent the other of the two directions in the image; a second pair of movable members movable with said first members in constant guiding contact with said perpendicular guide surfaces; two means connected with said second pair of movable members for movement therewith to hold said transparencies, respectively, on said assembly surface over said openings, respectively, with the two transparencies oriented with said guide surfaces; a stereoscopic viewer adapted for positioning over said openings for viewing said transparencies; means on said base structure to move the members of said first pair of members relative to each other along said fixed guide surfaces while the transparencies are under observation through said viewer, thereby to adjust said transparencies with respect to said one direction of the image; and means on said base structure to move the members of said second pair of members relative to each other along said perpendicular guide surfaces while the transparencies are under observation through said viewer, thereby to adjust said transparencies with respect to said other direction of the image.

14. A device as set forth in claim 13 in which all of said guide surfaces and both of said pairs of members are below said assembly surface and in which said engagement means extends retractably above said assembly surface.

15. A device as set forth in claim 13 which includes a holder for a picture mounting mask, said holder being movable toward said assembly surface to carry the mounting mask against the adjusted transparencies and in which said means for holding the transparencies comprises pins yieldingly extending above said assembly surface for retraction in response to pressure by the holder.

16. A device as set forth in claim 13 which includes a holder for a mask on which said transparencies are to be mounted and which includes means interconnecting said holder and said base structure to guide said holder in a predetermined path of movement between a retracted position and a position overlying said assembly surface.

17. A device as set forth in claim 13 which includes means interconnecting said viewer and said base structure to guide said viewer in a predetermined path between a retracted position and a viewing position adjacent said assembly surface.

18. A device as set forth in claim 17 which includes a holder for a mask on which the transparencies are to be mounted and in which both the holder and said viewer are hingedly mounted on said base structure to swing into and out of position adjacent said assembly surface.

19. A method of mounting a pair of stereoscopic transparencies upon a mounting mask with accurate alignment including the steps of: placing said pair of transparencies over two apertures on an assembly surface; viewing the transparencies through said apertures while adjusting said transparencies relative to each other in the vertical direction of said image to obtain the desired image effect; and bonding the adjusted transparencies on said surface to the mask.

20. A method of mounting a pair of stereoscopic transparencies upon a mask with accurate alignment relative to the vertical and horizontal directions of the stereoscopic image including the steps of: placing said pair of transparencies over two apertures on an assembly surface; viewing the transparencies through said apertures by an optical system having reticles and forming a stereoscopic reticle image indicating a plane of reference and adjusting the transparencies with respect to the vertical direction of the image; adjusting the spacing between the transparencies to obtain a desired apparent image distance relative to the apparent plane of the reticle image; and bonding the adjusted transparencies to said mask in their adjusted positions.

21. A method of mounting a pair of stereoscopic transparencies which includes the steps of: viewing said transparencies stereoptically through a pair of fixed reticles positioned to form a single image in front of the apparent planes of the stereoscopic image; directing the eyes on a plane of the picture image to cause the reticles to form two images in vertical displacement relative to each other in accord with the relative vertical displacement of image points on the two transparencies; and adjusting the two transparencies vertically relative to each other until the apparent vertical displacement of the two reticle images disappears.

22. A method of mounting a pair of stereoscopic transparencies with accurate alignment, including the steps of: placing said pair of transparencies over two apertures on an assembly surface; viewing said transparencies through said apertures while adjusting said transparencies relative to each other in the vertical and horizontal directions of the transparency image to obtain the desired image effect; and bonding the adjusted transparencies on said surface to a mask.

23. A method of mounting a pair of stereoscopic transparencies which includes the steps of: viewing said transparencies stereoptically through a pair of fixed reticles positioned to form a single image in front of the apparent planes of the stereoscopic image; directing the eyes on a plane of the picture image to cause the reticles to present a plurality of displaced images; adjusting the transparencies relative to each other in the vertical and horizontal directions of the image until the apparent displacement of the two reticle images is corrected; and securing the transparencies to a mask in such adjusted positions.

24. In a device for mounting a pair of stereoscopic transparencies with accurate alignment of the image and with respect to a plane of reference, the combination of: a base structure; means on said base structure for shiftably supporting said transparencies in spaced relation to one another; means on said base structure and operatively connected to said supporting means to adjust the latter with respect ot the vertical direction of the image; and means enabling visual guidance in the adjustment of the transparencies.

25. In a device for mounting a pair of stereoscopic transparencies with accurate alignment of the image and with respect to a plane of reference, the combination of: a base structure; means on said base structure for shiftably supporting said transparenicies in spaced relation to one another; means on said base structure and operatively connected to said supporting means to adjust the latter with respect to the vertical and horizontal direction of the image; and means enabling visual guidance in the adjustment of the transparencies.

26. A device for positioning a pair of stereoscopic transparencies wtih accurate alignment of the image, including: base means providing an assembly surface; said surface having a pair of apertures; means for supporting a pair of transparencies; and means for adjusting the relative positions of said transparencies with respect to the vertical direction of the image.

27. A device for positioning a pair of stereoscopic transparencies with accurate alignment of the image, including: base means providing an assembly surface; said surface having a pair of apertures; means for supporting a pair of transparencies; means for adjusting the relative positions of said transparencies with respect to the vertical direction of the image; and viewer means on said base means movable to a position overlying said transparencies; said viewer means having means for producing a reference image for guidance in adjusting said transparencies.

References Cited in the file of this patent

UNITED STATES PATENTS

| | | |
|---|---|---|
| 1,756,062 | Holst | Apr. 29, 1930 |
| 2,338,189 | Libby et al. | Jan. 4, 1944 |
| 2,524,178 | Rochwite | Oct. 3, 1950 |
| 2,596,253 | Kurkjian | May 13, 1952 |
| 2,639,254 | Smith | May 19, 1953 |
| 2,684,537 | Rosie | July 27, 1954 |
| 2,704,566 | Thompson et al. | Mar. 22, 1955 |